(12) United States Patent
Blais et al.

(10) Patent No.: US 8,590,660 B2
(45) Date of Patent: Nov. 26, 2013

(54) MOTOR VEHICLE PEDAL HAVING A SAFETY DEVICE

(75) Inventors: Frédéric Blais, Vassy (FR); Eric Ferrette, Laize la Ville (FR); Jacques Guevelbadou, Falaise (FR)

(73) Assignee: MGI Coutier (FR)

( * ) Notice: Subject to any disclaimer, the term of this patent is extended or adjusted under 35 U.S.C. 154(b) by 0 days.

(21) Appl. No.: 13/263,654

(22) PCT Filed: Apr. 7, 2010

(86) PCT No.: PCT/FR2010/050674
§ 371 (c)(1),
(2), (4) Date: Jan. 6, 2012

(87) PCT Pub. No.: WO2010/116092
PCT Pub. Date: Oct. 14, 2010

(65) Prior Publication Data
US 2012/0096982 A1    Apr. 26, 2012

(30) Foreign Application Priority Data
Apr. 7, 2009    (FR) ..................................... 09 52274

(51) Int. Cl.
*G05G 1/327*    (2008.04)
(52) U.S. Cl.
USPC ............................. 180/274; 74/513; 74/560
(58) Field of Classification Search
USPC .............................. 180/274; 74/512, 513, 560
See application file for complete search history.

(56) References Cited

U.S. PATENT DOCUMENTS 5,996,439 A    12/1999    Elton et al.

FOREIGN PATENT DOCUMENTS

| DE | 4409324 A1 | 10/1994 |
|---|---|---|
| DE | 10022813 A1 | 11/2001 |
| EP | 0788931 A2 | 8/1997 |
| EP | 0805079 A2 | 11/1997 |
| EP | 1038720 A2 | 9/2000 |
| EP | 1557330 A2 | 7/2005 |
| EP | 1787873 A2 | 5/2007 |
| EP | 1876076 A2 | 1/2008 |
| FR | 2832969 A1 | 6/2003 |

(Continued)

OTHER PUBLICATIONS

International Search Report issued Jul. 22, 2010 by European Patent Office re: PCT/FR2010/050674; citing: EP 1 876 076 A2, EP 1 038 720 A2, US 5,996,439 A, EP 0 805 079 A2, FR 2 843 569 A1, EP 1 787 873 A2, EP 1 557 330 A2, EP 0 788 931 A2, WO 03/045750 A1 and WO 03/097414 A1.

*Primary Examiner* — Paul N Dickson
*Assistant Examiner* — Timothy Wilhelm
(74) *Attorney, Agent, or Firm* — Cantor Colburn LLP

(57) ABSTRACT

The pedal is provided with a safety device, which works so as to release this pedal in the event of the vehicle suffering a frontal impact. The pedal body (2) is mounted on a bracket (4) having two parallel vertical plates (4a, 4b), in which there are arranged parallel holding slots (8a, 8b) through which the pivoting shaft (3) of the pedal passes, the holding slots (8a, 8b) opening onto the rear edge of the plates (4a, 4b) and/or being flared to the rear. A lever (9) is provided which, in the event of an impact, pivots in engagement with the pivoting shaft (3) in order to release it until it emerges completely from the two holding slots (8a, 8b) or is no longer retained by the edges of these slots. The pedal is thus entirely released, that is to say disconnected from its bracket (4), and can then "fall". This pedal may be a brake pedal or a clutch pedal.

10 Claims, 10 Drawing Sheets

(56) References Cited

FOREIGN PATENT DOCUMENTS

| | | | |
|---|---|---|---|
| FR | 2843569 | A1 | 2/2004 |
| WO | 03/045750 | A1 | 6/2003 |
| WO | 03/097414 | A1 | 11/2003 |

MOTOR VEHICLE PEDAL HAVING A SAFETY DEVICE

TECHNICAL FIELD

The present invention generally relates to pedals installed in the driver's area of a motor vehicle, such as brake and clutch pedals. More particularly, this invention pertains to one such motor vehicle pedal that is provided with a safety device, coming into play in the event of an impact suffered by the vehicle and in particular in case of frontal impact.

BACKGROUND

In a traditional design, a motor vehicle pedal, such as a brake pedal, is designed as a lever pivotably mounted around a substantially horizontal shaft, fixed relative to the structure of the vehicle.

More recently, to satisfy the standards and other safety stipulations in case of impact, in particular frontal impact, suffered by a motor vehicle, pedals have appeared provided with a special mounting allowing, following an impact, a certain release of the pedal intended to prevent that pedal from causing injuries to the legs or feet of the concerned vehicle's driver. The solutions proposed to that end in general consist of releasing the pivoting shaft of the pedal, either by sectioning the ends of said pivoting shaft, or more simply by allowing said pivoting shaft to move over a certain travel, along suitably oriented guiding slots or slits.

The latter solution is illustrated for example by German patent documents DE 4 409 324 A1 and DE 100 22 813 A1, or by French patent application FR 2 832 969 A1.

Considering more particularly the embodiment disclosed by document FR 2 832 969 A1, a pedal that is in particular a brake pedal is pivotably mounted along an axis of rotation on a bracket, provided with two parallel plates. A driving lever, which can be connected to a fixed portion of the vehicle, imposes, in case of impact, a movement of the pivoting shaft relative to the bracket, in a direction defined by parallel slots formed in the two plates of the bracket. Thus, in case of frontal impact, the pivoting shaft of the pedal is moved from a first position, which is its normal position, toward a second position situated further back (relative to the front-to-back direction of the vehicle), the backward movement of the shaft occurring along the path imposed by the slots. This backward movement of the shaft in turn requires tilting of the pedal assembly, so that the shoe thereof is moved forward relative to its normal position. The purpose of this operating mode is to avoid risks of lesions, in particular at the driver's ankles, these risks being caused by the penetration of the shoe inside the passenger compartment as a result of the deformation of the vehicle body.

In such an embodiment, the "release" of the pedal is partial, since the pivoting shaft thereof remains, even after an impact, engaged in the slots of the plates of the bracket. Furthermore, the movement freedom of the pivoting shaft depends on the gripping of the ends of said shaft on both plates. The residual friction on these plates opposes the movement of the shaft, therefore of the pedal, resulting in the need to impose the travel path of this shaft through complete guiding in the slots and by the driving lever.

BRIEF SUMMARY

The present invention aims to significantly improve, in terms of the safety and reliability of the result, the type of pedal considered here, by providing a solution that, while remaining simple and economical, makes it possible to completely, rather than partially, release the pedal, and in particular its pivoting shaft, in case of frontal impact.

To that end, the invention relates to a motor vehicle pedal with a safety device, the pedal being mounted along a substantially horizontal pivoting shaft on a bracket provided with two parallel vertical plates, the pivoting shaft of the pedal passing through parallel holding slots formed in the two plates, and a lever being provided to pivot, in case of impact, relative to the bracket and thus to allow the pivoting shaft of the pedal to move inside said holding slots, the pedal with safety device being essentially characterized by the fact that the respective slots of the vertical plates of the bracket open on the rear edge of said plates and/or are flared toward said rear edge of the plates, and by the fact that the angle of rotation of the lever in case of impact is such that said lever can cooperate with the pivoting shaft of the pedal to release it, until said shaft is completely outside the two through guide slots or is no longer held between the edges of the guide slots in the case of flared slots, the pivoting shaft thus being completely released and in turn releasing the pedal by disconnecting it from the bracket.

As one can see, the inventive device thus completely releases the pivoting shaft from the pedal, therefore the pedal itself, which, no longer being held, can then "fall" under the effect of its own weight.

More precisely, in case of frontal impact and in the case of through holding slots, the lever starts a rotational movement around its own pivoting shaft relative to the bracket, so as to successively cause:
the release of the pivoting shaft from the pedal,
then the exit of the shaft outside the through holding slots, with pivoting of the pedal,
and lastly the complete release of the pivoting shaft of the pedal relative to the holding slots, which then allows the pedal assembly to "fall. "

In one preferred embodiment of this pedal with a safety device, the lever itself has two through maintenance slots that are respectively arranged in two plates of said lever, parallel to the vertical plates of the bracket, the maintenance slots initially being passed through by the pivoting shaft of the pedal, the two plates of the lever being respectively situated on a same side relative to each of the vertical plates of the bracket, such that, in the first part of the lever's rotation in case of impact, the maintenance slots of the plates of said lever are released from the pivoting shaft of the pedal and thereby release said pivoting shaft, both in its own axial direction and in the longitudinal direction of the vehicle. The pivoting shaft of the pedal is thus released mechanically and certainly, in case of impact, the proposed configuration then making it possible to release the shaft from all lateral friction.

Advantageously, the through maintenance slots, formed in the plates of the lever, are arc of circle-shaped slots centered at a point near the pivoting shaft of said lever. Thus, when the lever starts to rotate around its own pivoting shaft, the pivoting shaft of the pedal is first released. The release of that shaft, under the action of the inertial force resulting from the abrupt deceleration of the vehicle, causes the pedal to pivot around the resistant point formed by the end of the rod connecting said pedal with the braking amplifier (using a brake pedal as an example). More specifically, the center of gravity of the pedal being located below this resistant point, the inertial torque causes the pedal to pivot, and this operation is all the more true if the driver is in the process of braking, resulting in increased safety.

Various embodiments of the invention can be considered, depending on the concerned type of pedal.

Thus, in the case of a brake pedal, once released that pedal is only "connected" to the vehicle by the actuator rod of the brake.

In the case of a clutch pedal, on the other hand, often associated with the pedal is a force assistance device that can bother the natural "fall" of the pedal, even if the pivoting shaft thereof has been released. In that case, the invention also advantageously provides that the aforementioned lever includes an ejector arm provided to cooperate with the pedal, at a point separate from its pivoting shaft, to drive said pedal in order to release it from its bracket and cause its "fall" or release in a definite manner.

According to one advantageous embodiment, the ejector arm is positioned, on the aforementioned lever, so as to keep the pivoting shaft of the pedal in position, in the normal operating position thereof. The robustness of the device is thus increased.

The holding slots can be configured so as to limit the displacement of the pivoting shaft of the pedal, after that shaft is released, so that the "fall" of the pedal is not complete. The same result can be obtained, in particular with through holding slots, by providing that the two plates of the bracket are connected by a transverse wall forming a stop limiting the displacement of the pedal, after releasing the pivoting shaft thereof.

In all cases, the general orientation of the through and/or flared holding slots is such that it makes it possible to release the pedal in a definite manner, in case of impact, even with bearing thereon. In other words, the general orientation of these slots corresponds to the direction of the resulting force on the pivoting shaft of the pedal, when the foot bears on that pedal.

BRIEF DESCRIPTION OF THE DRAWINGS

In any case, the invention will be better understood using the following description, in reference to the appended diagrammatic drawing showing, as examples, several embodiments of said motor vehicle pedal with a safety device.

DETAILED DESCRIPTION

Figure 1:
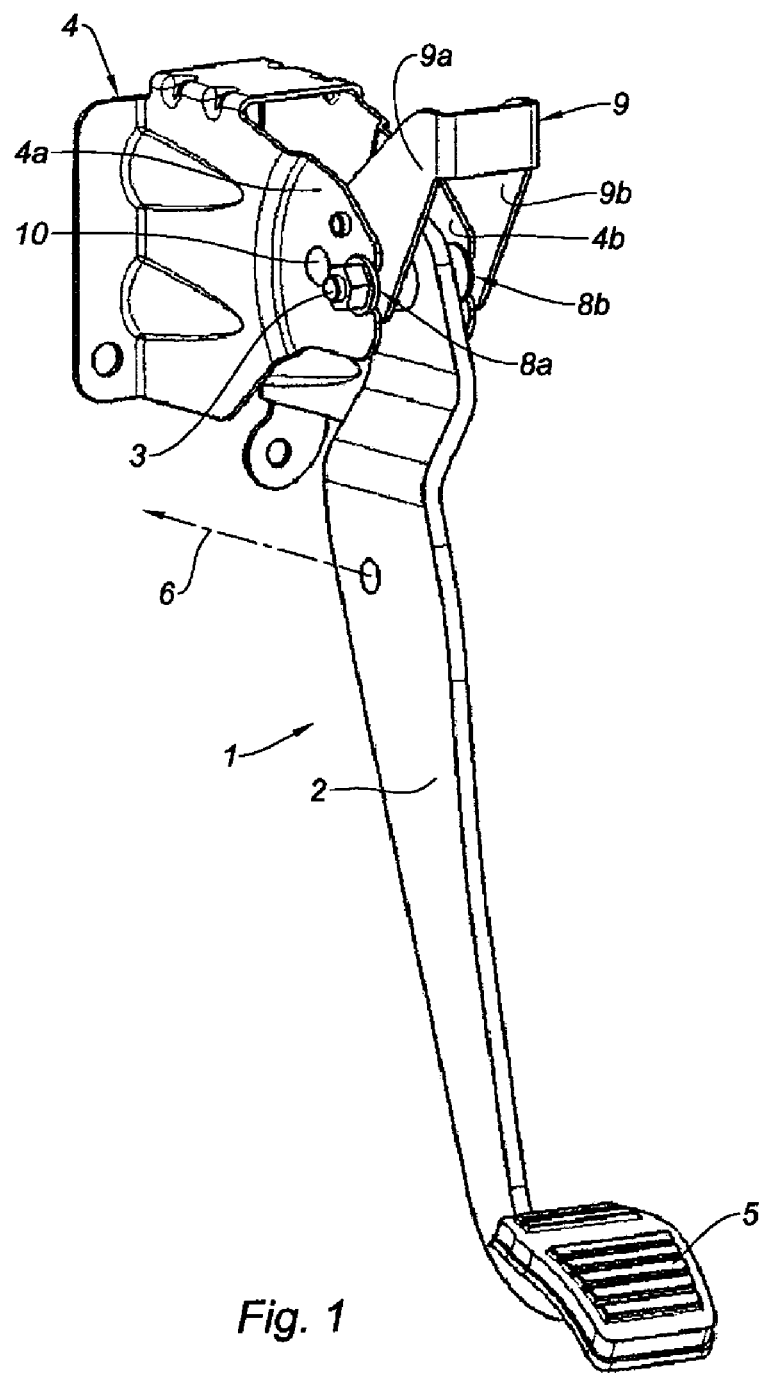
FIG. 1 is an overall perspective view of a pedal according to the present invention, in its normal usage position.

In reference to the drawing, a motor vehicle pedal 1 includes a pedal body 2 that, during normal operation of the pedal, pivots around a horizontal axis of rotation 3 relative to a pedal bracket 4, installed in a fixed position in the concerned motor vehicle. The lower end of the pedal body 2 supports a shoe 5, which is the part by which the driver of the vehicle actuates the pedal 1 through bearing via his foot. The pedal body 2 thus constitutes a lever that, by pivoting around the shaft 3, can transmit a movement and a force to a transmission or control member, variable depending on the type of pedal and the control mode, with or without assistance for the force, said member being able to be an actuating rod as symbolized in 6.

The pedal body 2 can also be connected to the pedal bracket 4 by a suitably guided return spring 7, which returns the shoe 5 to its idle position, when it is no longer pushed in by the driver's foot.

The pedal bracket 4 includes two parallel vertical plates 4a and 4b, which form a sort of yoke. Respectively arranged in the two plates 4a and 4b are two parallel holding slots 8a and 8b, which both open on the rear edge (in reference to the longitudinal direction of the vehicle) of the respective plate. In the normal state of the pedal 1, the axis of rotation 3 is positioned in the two holding slots 8a and 8b, and said shaft 3 connects the two plates 4a and 4b.

The pedal 1 also comprises a release lever 9 provided to come into play in case of impact. The lever 9 in turn has two parallel vertical plates 9a and 9b, which are also parallel to the vertical plates 4a and 4b of the bracket 4. The two vertical plates 9a, 9b of the lever 9 are respectively situated on a same side relative to each of the two vertical plates 4a, 4b of the bracket 4. A horizontal shaft 10, which passes through all of these plates 4a, 4b, 9a and 9b, performs a pivoting assembly of the lever 9 relative to the bracket 4, the shaft 10 being parallel to the axis of rotation 3 of the pedal body 2.

Figure 4:
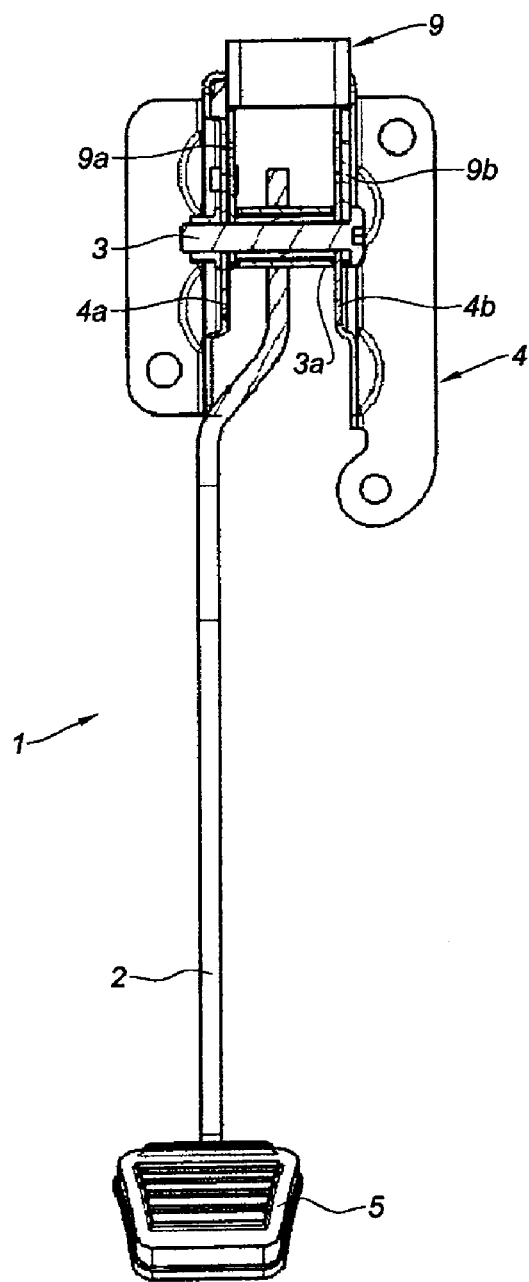
FIG. 4 is a transverse cross-sectional view of the pedal, along IV-IV of FIG. 3.
Figure 5:
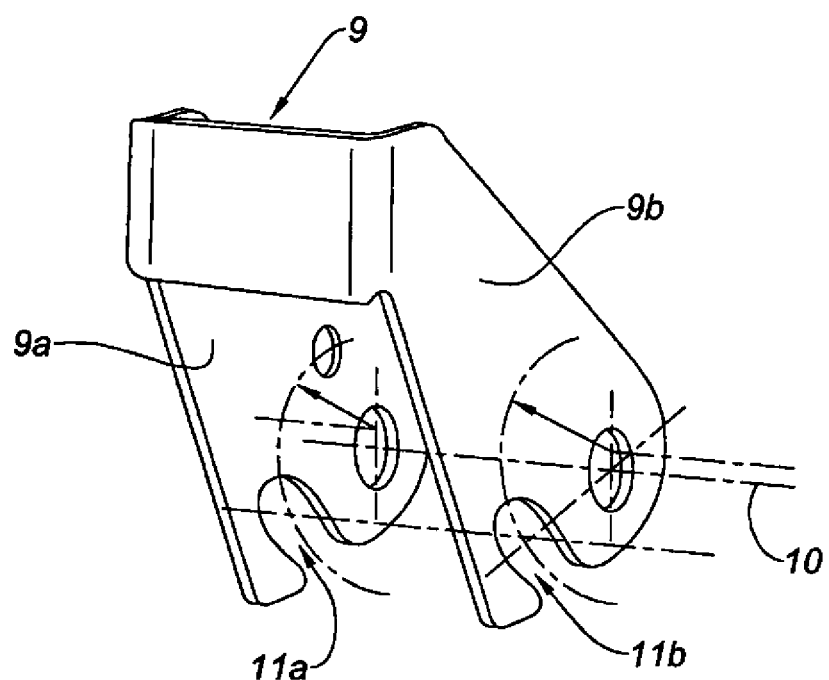
FIG. 5 shows, in perspective view, the release lever alone.

The release lever 9 in turn includes, formed in its two plates 9a and 9b, respective maintenance through slots 11a and 11b, which are passed through normally by the axis of rotation 3 of the pedal body 2 and which maintain said shaft 3 longitudinally, and also transversely through a certain gripping that causes a crosspiece 3a mounted around the shaft 3 to come into play (see FIG. 4). The two maintenance slots 11a and 11b of the lever 9 have an arc of circle shape and are centered at a point near the pivoting shaft 10 of said lever 9 (see FIG. 5). More specifically, the center of the slots 11a and 11b is placed slightly above the pivoting shaft 10 of the lever 9, so that in case of loosening of the pivoting shaft 3 from the pedal body 2 and stressing of the pedal, the reaction on the shaft 3 related to the bearing force from the foot does not tend to eject and pivot the lever 9, but contributes to the opposite, i.e. to holding the lever 9 so it can play its role in case of impact. Nevertheless, a frangible rivet can also prohibit any unwanted pivoting movement of the lever 9, in the normal travel phases of the vehicle.

Figure 2:
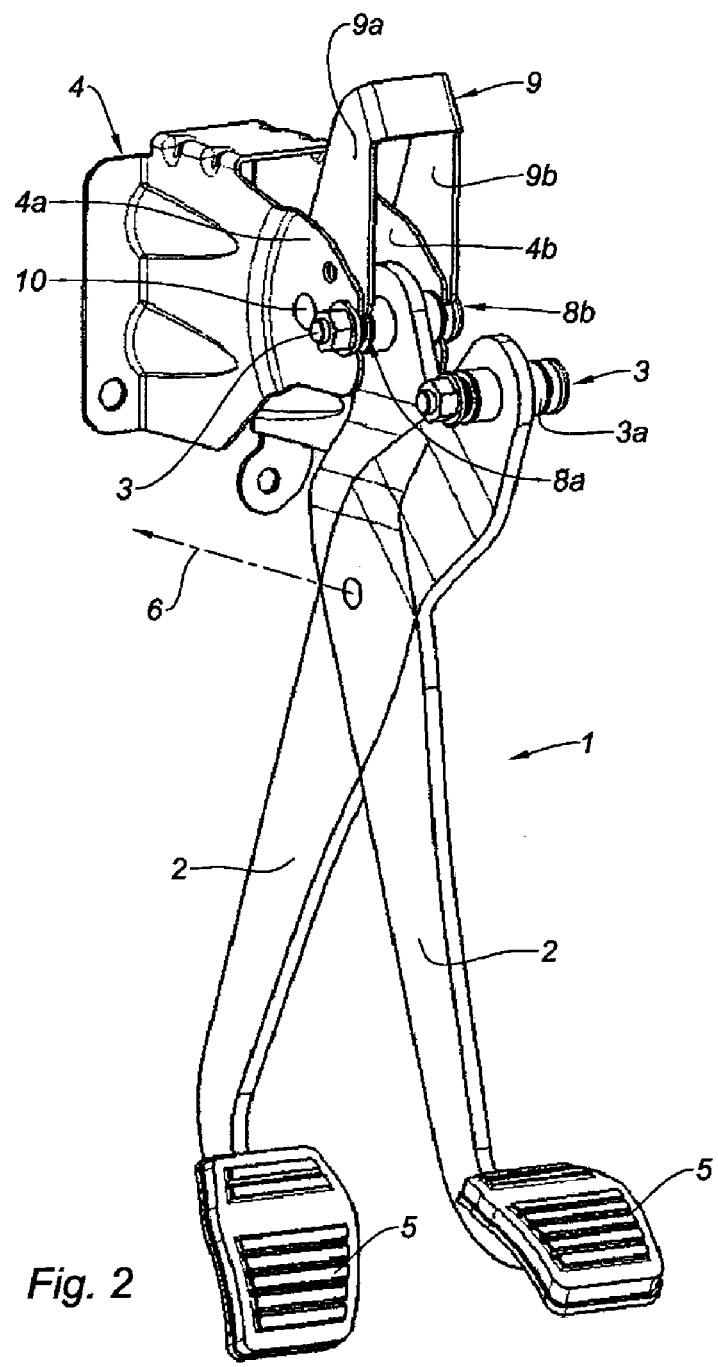
FIG. 2 is a perspective view similar to FIG. 1, illustrating (with indication of two distinct positions) the process of releasing the pedal in case of impact.
Figure 3:
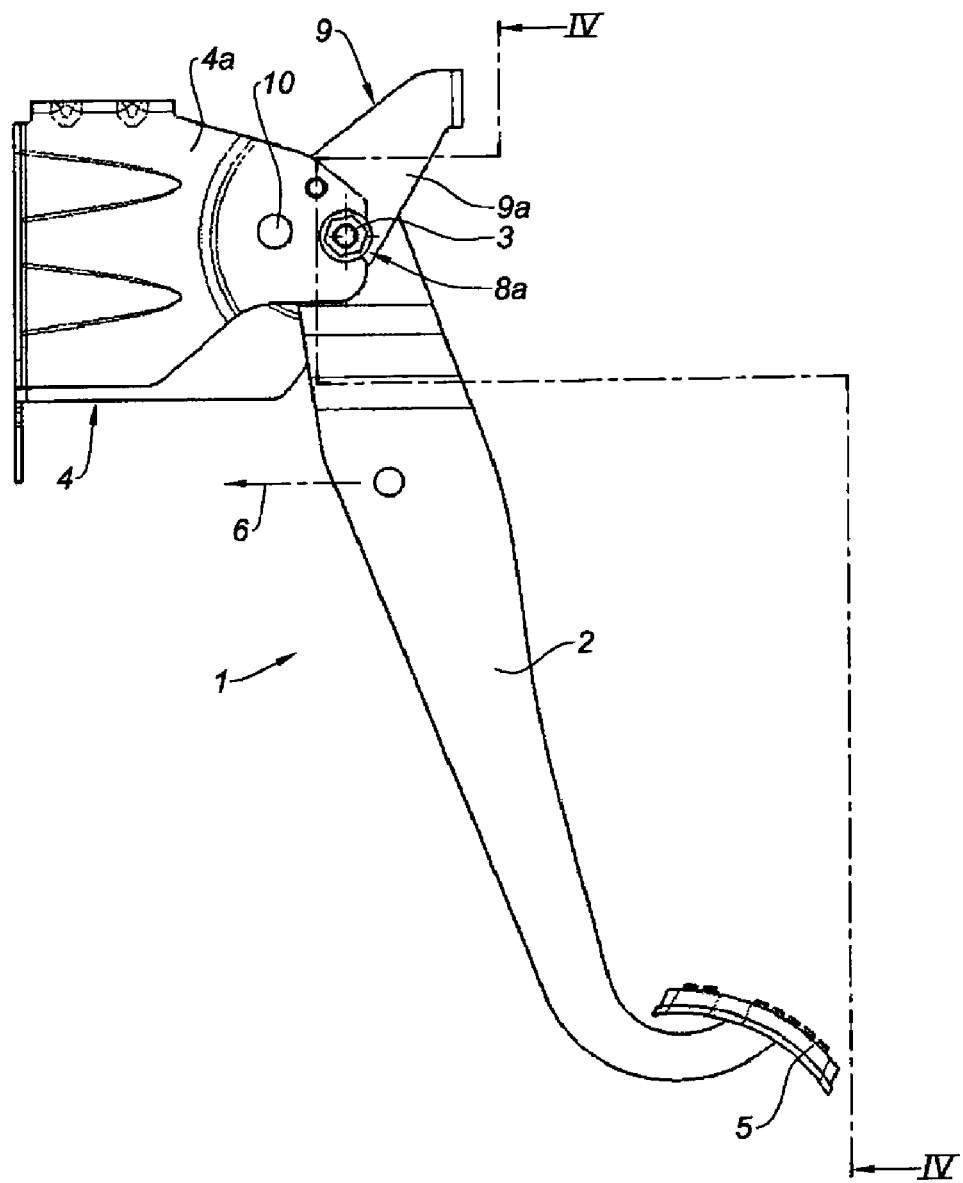
FIG. 3 is a side view of the pedal of FIGS. 1 and 2, in the normal usage position.
Figure 7:
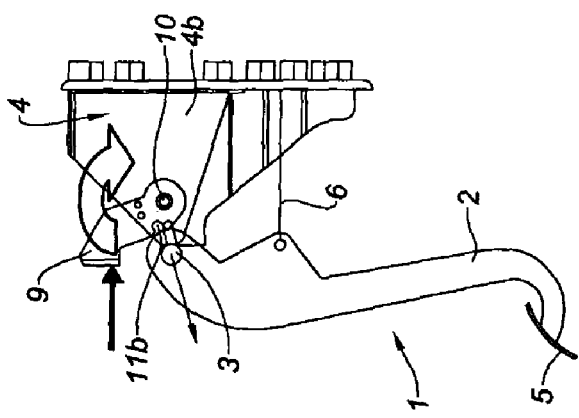
Figure 6:
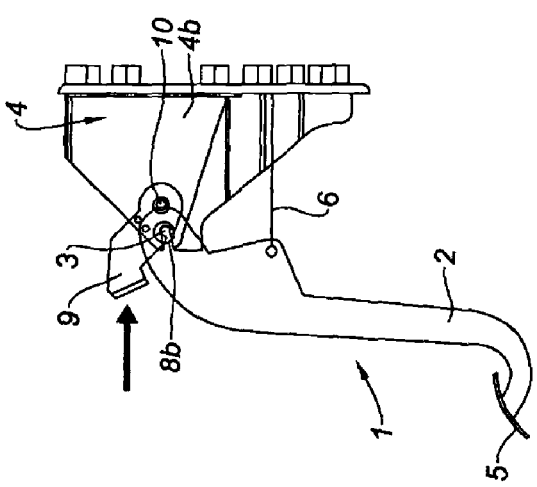

In the case of an impact suffered by the vehicle, a deformation of the structure of the body for example causes an impact of the steering column (not shown) on the lever 9 and drives the rotation of said lever around the shaft 10, which moves the maintenance slots 11a and 11b of the lever 9 away from the shaft 3, and thereby transversely and longitudinally releases the pivoting shaft 3 from the pedal body 2. That shaft 3 then becomes free to move in the through holding slots 8a and 8b of the bracket 4, and said shaft 3 is released from said slots 8a and 8b, to ultimately exit said slots. The movement of the shaft 3 in the holding slots 8a and 8b of the bracket 4 is accompanied by a pivoting of the pedal body 2—see FIGS. 2, 6 and 7.

Figure 8:
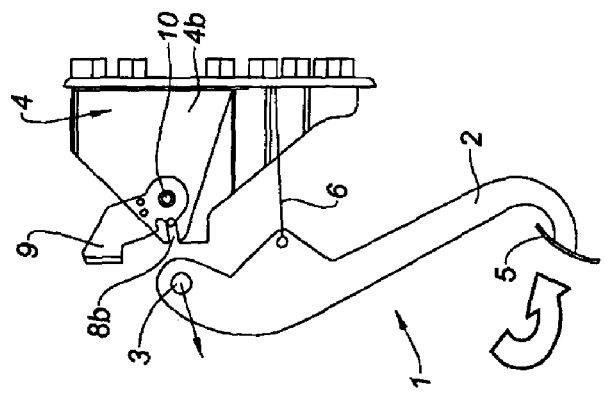
FIGS. 6, 7 and 8 are diagrams illustrating, in side view, successive moments in the process of releasing the pedal of the preceding figures.

Lastly, the shaft 3 being completely outside the holding slots 8a and 8b of the bracket 4, and therefore completely released, the pedal assembly, i.e. the pedal body 2 with the shoe 5, can "fall" under the effect of gravity, its center of gravity being situated lower than the fastening point of the actuating rod 6; the body of the pedal 2 remains attached to the vehicle, however, by the actuating rod 6—see FIG. 8—or by any other transmission or control member.

This embodiment, and the associated operation (in case of impact), are in particular applicable to a pedal 1 that is a brake pedal, the rod 6 in that case being a brake actuating rod; it is also applicable to a clutch pedal.

Figure 10:
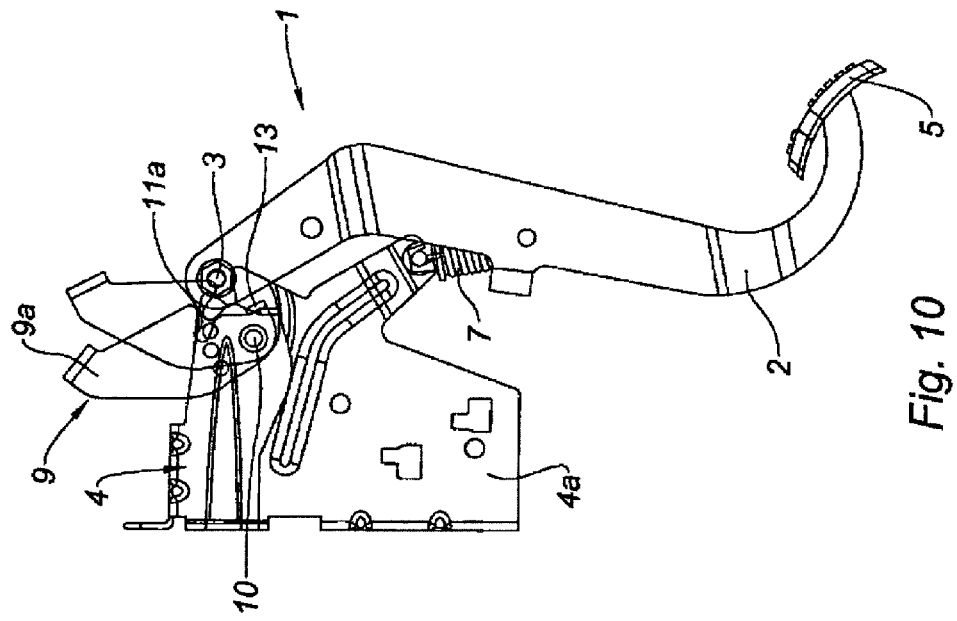
FIG. 10 is a view similar to FIG. 9, but showing the ejector arm in action, during an impact.
Figure 9:
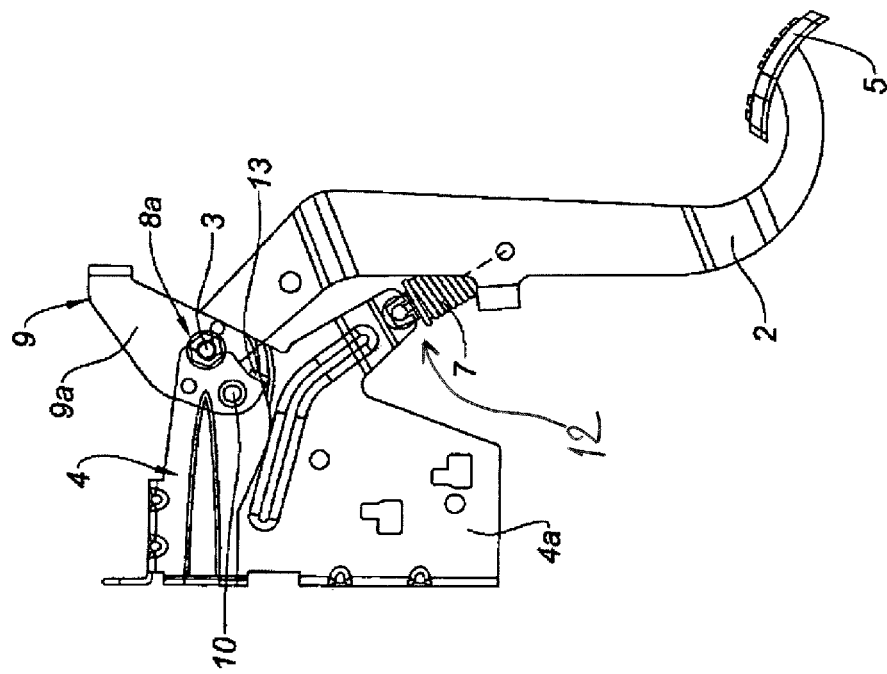
FIG. 9 shows, in side view, one alternative of this pedal with a release lever having an ejector arm, in the normal usage position.

FIGS. 9 and 10 illustrate an alternative of the inventive pedal 1, which is instead a clutch pedal, provided with a force assistance device 12 that can bother the natural "fall" of the pedal, even after the pivoting shaft 3 is released. In that case, the release lever 9 also includes an ejector arm 13 that, during the pivoting of said lever 9 in case of impact, will in a first part of its travel longitudinally release the pivoting shaft 3 without compensating the force exerted by the assistance device. In a second part of its travel, the ejector arm 13 will exert compensation in the direction opposite the force exerted by the assistance device, the shaft 3 being released. Lastly, in a third part of the travel of the ejector arm 13, the latter exerts a thrust on the pedal body 2, at a point remote from the pivoting shaft 3, so that the pedal body 2 describes a rotation around the connecting shaft with the transmission or control member. Thus, the release of the shaft 3 is ensured before neutralizing the force exerted by the assistance device, irrespective of the pedal's position: idle, completely pushed in or any intermediate position. Thus, the pedal body 2 is necessarily released from the bracket 4, with the result that its "fall" is caused in a definite manner, the assistance device being able, beyond a certain point, to add its force to the weight of the pedal to favor its "fall."

In practice, the ejector arm 13 here results from a simple extension of one of the plates 9a or 9b of the lever 9.

Figure 11:
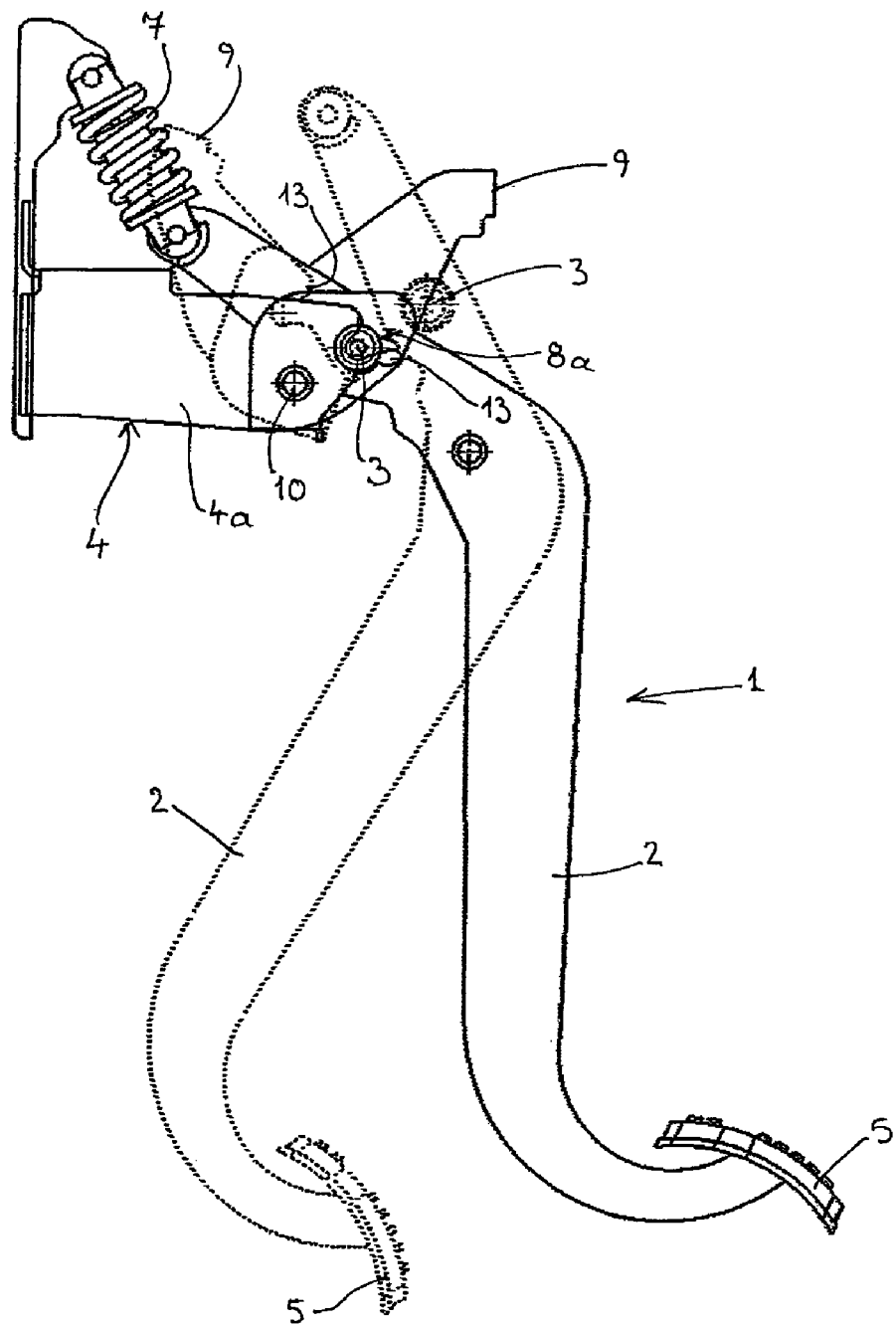
FIG. 11 is a side view of another alternative with an ejector arm.

FIG. 11 shows another embodiment, also provided with an ejector arm 13 attached to the release lever 9. In that figure, the solid lines indicate the idle position of the pedal body 2, while the broken lines correspond to the release of said pedal body, after an impact. The ejector arm 13 here is a separate element, for example connected by welding to the lever 9. This ejector arm 13 makes it possible to offset the force of an assistance device so as to rotationally release the pedal once its shaft 3 is released in case of impact.

The embodiment of FIG. 11, with an ejector arm 13 formed by a separate element (and not by a simple extension of the lever 9), has the advantages of:

- Guaranteeing contact and functional cooperation between the flank of the pedal body 2 and the ejector arm, with a larger bearing surface and better distribution of the force;
- Allowing the transmission of a higher torque, in other words a greater ejection force, to the pedal body 2;
- Releasing the shaft 3 more cleanly after the rotation of the lever 9.

Figure 12:
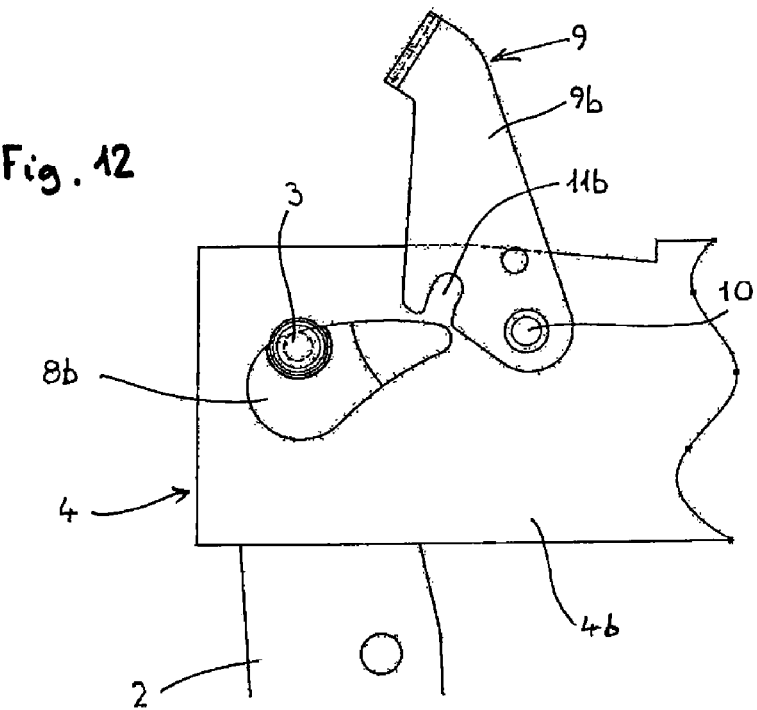
FIG. 12 is a partial side view of another alternative, with limitation of the displacement of the shaft of the pedal after an impact.

FIG. 12 shows an alternative, in which the holding slots 8a and 8b do not open on the rear edge of the plates 4a and 4b of the pedal bracket 4, but have a "water drop" shape, such that said slots 8a and 8b flare from front to back, with the result that the pivoting shaft 3 is released from contact with the edge of the slot, once the release lever 9 has pivoted. The configuration illustrated here makes it possible to limit the displacement of the pivoting shaft 3 of the pedal, after an impact, preventing a complete "fall" of the pedal.

Figure 13:
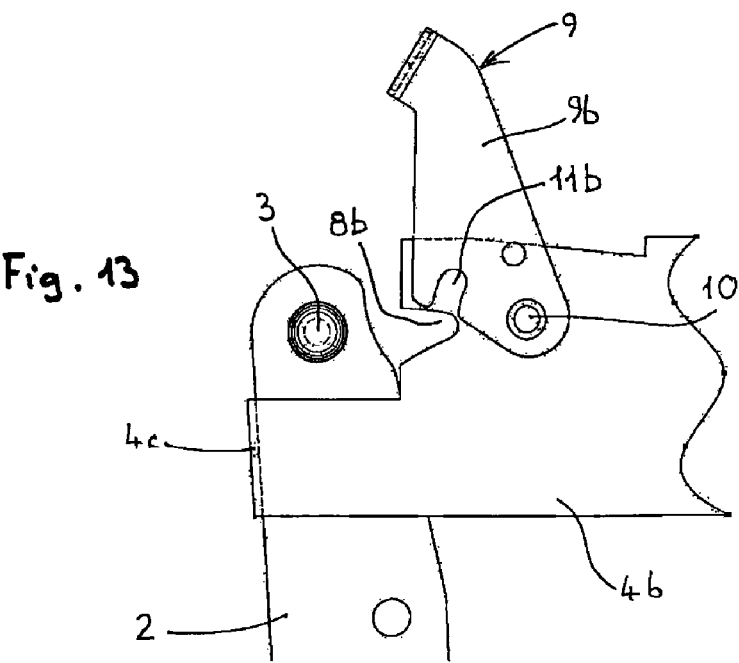
FIG. 13 is a partial side view of one alternative, with limitation of the displacement of the shaft of the pedal after a shock.

FIG. 13 shows still another alternative, in which the holding slots 8a and 8b open on the rear edge of the plates 4a and 4b of the pedal bracket 4. The two plates 4a and 4b here are connected by a transverse wall 4c that "closes" the pedal bracket 4. Thus, after releasing the pivoting shaft 3 from the pedal body 2 via the rotation of the lever 9, the shaft 3 is released from the slots 8a and 8b but the displacement of that shaft 3, therefore of the pedal, is limited by the abutment of the pedal body 2 against the transverse wall 4c.

Figure 14:
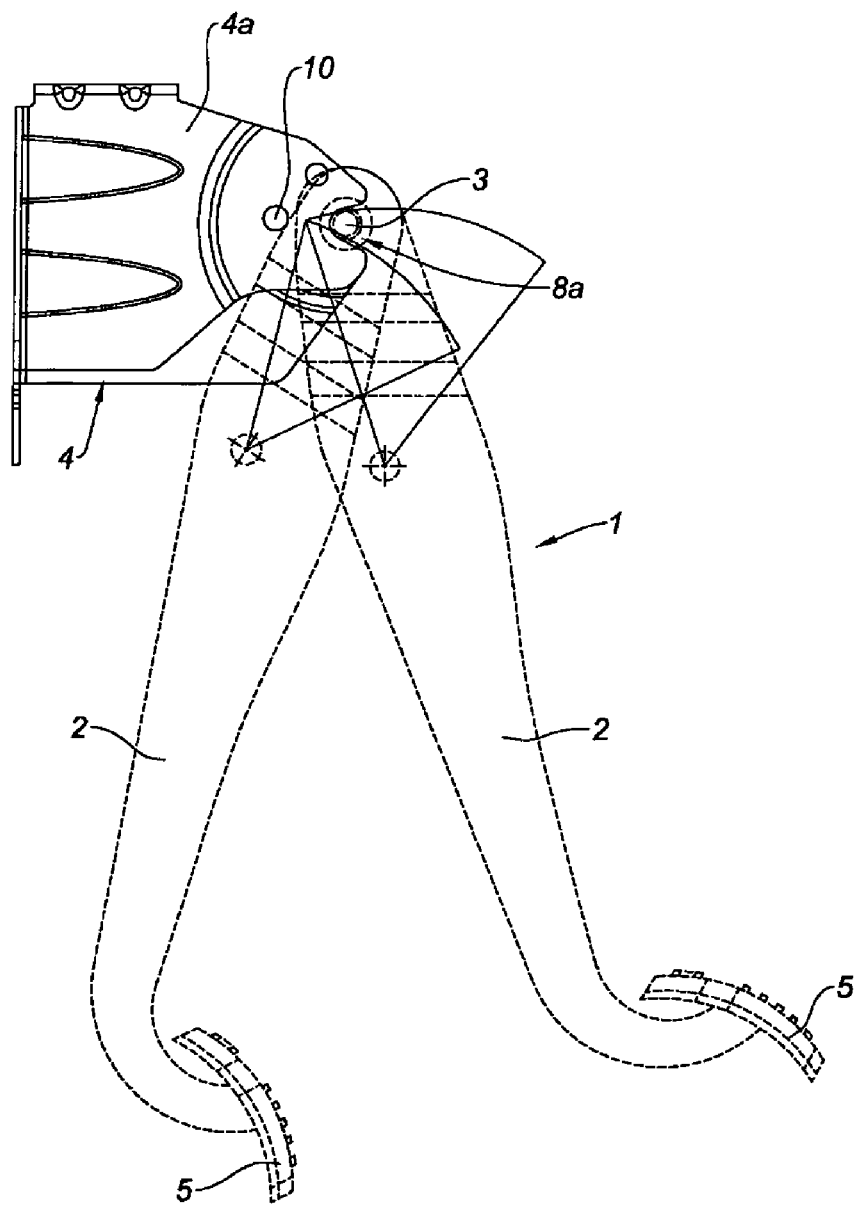
FIG. 14 shows an alternative shape of the holding slots of the pedal bracket.

Lastly, as shown in FIG. 14, the through holding slots 8a and 8b of the pedal bracket 4 can have a very flared V shape, which ensures a free release of the pivoting shaft in the two extreme pedal body positions 2, i.e. the idle position of the pedal and the completely pushed in position of the pedal, and of course also for any intermediate position of said pedal. More particularly, as illustrated by the outlines in said FIG. 11, the upper edge of the slots 8a and 8b corresponds to the path into the idle position, and the lower edge of the same slots corresponds to the path into the pushed in position.

It goes without saying, and results from the above, that the invention is not limited to only the embodiments of this motor vehicle pedal with safety device that have been described above, as examples; on the contrary, it encompasses all alternative embodiments and applications respecting the same principle. It is in this way in particular that it would not be beyond the scope of the invention to modify the details of various components or parts of the pedal, for example the shape of the slots of the pedal bracket and the release lever.

The invention claimed is:

1. A motor vehicle pedal with a safety device, the pedal being mounted along a substantially horizontal pivoting shaft on a bracket provided with two parallel vertical bracket plates, the pivoting shaft of the pedal passing through parallel holding slots formed in said bracket plates, and a lever being provided to pivot, in case of impact, relative to the bracket and thus to allow the pivoting shaft of the pedal to move inside said holding slots, wherein said respective holding slots open on the rear edge of said bracket plates, and wherein an angle of rotation of the lever in case of impact is such that said lever can cooperate with the pivoting shaft of the pedal to release it, until said shaft is completely outside said holding slots, the pivoting shaft of the pedal thus being completely released and in turn releasing the pedal by disconnecting it from the bracket, and wherein the lever itself has two through supporting slots that are respectively arranged in two lever plates which are parallel to said bracket plates, said supporting slots initially being passed through by the pivoting shaft of the pedal, said two lever plates being respectively situated on a same side relative to each of said bracket plates, such that, in a first part of the lever's rotation in case of impact, said holding slots are released from the pivoting shaft of the pedal and thereby release said pivoting shaft of the pedal, both in its own axial direction and in the longitudinal direction of the vehicle.

2. The motor vehicle pedal according to claim 1, wherein, in case of frontal impact and in case of opening holding slots, the lever starts a rotational movement around a lever pivoting shaft relative to the bracket, so as to successively cause:

a release of the pivoting shaft of the pedal,
then an exit of the shaft outside the holding slots, with pivoting of the pedal, and lastly a complete release of the pivoting shaft of the pedal relative to the holding slots, which then allows the pedal to "fall."

3. The motor vehicle pedal according to claim 1, wherein said through supporting slots are arc of circle-shaped slots centered at a point near the lever pivoting shaft.

4. The motor vehicle pedal according to claim 1, wherein the aforementioned lever includes an ejector arm provided to cooperate with the pedal, at a point separate from the pivoting shaft of the pedal, to drive said pedal in order to release it from its bracket and cause its "fall" or release in a definite manner.

5. The motor vehicle pedal according to claim 4, wherein the ejector arm is positioned, on the aforementioned lever, so as to keep in position the pivoting shaft of the pedal, in a normal operating position thereof.

6. The motor vehicle pedal according to claim 1, wherein the holding slots are configured so as to limit displacement of the pivoting shaft of the pedal, after the pivoting shaft of the pedal is released.

7. The motor vehicle pedal according to claim 1, wherein said bracket plates are connected by a transverse wall forming a stop limiting displacement of the pedal, after releasing the pivoting shaft of the pedal.

8. The motor vehicle pedal according to claim 7, wherein said holding slots have a V shape, ensuring a free release of the pivoting shaft of the pedal.

9. The motor vehicle pedal according to claim 1, wherein a general orientation of the holding slots corresponds to a direction of the resulting force on the pivoting shaft of the pedal, when a foot bears on that pedal.

10. A motor vehicle pedal with a safety device, the pedal being mounted along a substantially horizontal pivoting shaft on a bracket provided with two parallel vertical bracket plates, the pivoting shaft of the pedal passing through parallel holding slots formed in said bracket plates, and a lever being provided to pivot, in case of impact, relative to the bracket and thus to allow the pivoting shaft of the pedal to move inside said holding slots wherein said respective holding slots are flared toward said rear edge of said bracket plates and wherein an angle of rotation of the layer in case of impact is such that said lever can cooperate with the pivoting shaft of the pedal to release it, until said shaft is no longer held between edges of the holding slots, the pivoting shaft of the pedal thus being completely released and in turn releasing the pedal by disconnecting it from the bracket, and wherein the lever itself has two through supporting slots that are respectively arranged in two lever plates which are parallel to said bracket plates, said supporting slots initially being passed through by the pivoting shaft of the pedal, said two lever plates being respectively situated on a same side relative to each of said bracket plates, such that, in a first part of the lever's rotation in case of impact, said holding slots are released from the pivoting shaft of the pedal and thereby release said pivoting shaft of the pedal, both in its own axial direction and in the longitudinal direction of the vehicle.

* * * * *